(12) United States Patent
Peng

(10) Patent No.: US 7,245,653 B2
(45) Date of Patent: Jul. 17, 2007

(54) METHOD OF TRACKING FINGER ASSIGNMENT

(75) Inventor: Bao-Chi Peng, Taoyuan (TW)

(73) Assignee: BENQ Corporation, Taoyuan (TW)

( * ) Notice: Subject to any disclaimer, the term of this patent is extended or adjusted under 35 U.S.C. 154(b) by 745 days.

(21) Appl. No.: 10/377,452

(22) Filed: Feb. 28, 2003

(65) Prior Publication Data

US 2003/0171136 A1    Sep. 11, 2003

(30) Foreign Application Priority Data

Mar. 7, 2002   (TW) .............................. 91104320 A

(51) Int. Cl.
*H04B 1/00* (2006.01)
*H04B 7/216* (2006.01)
(52) U.S. Cl. ...................... 375/148; 375/147; 375/144; 375/140; 370/342
(58) Field of Classification Search ............ 455/550.1, 455/78, 422, 561, 562, 133, 303, 304, 226.1, 455/563, 82, 277.1, 277, 219, 550; 375/130, 375/316, 219, 341, 137, 355, 340, 345, 346, 375/369, 231, 324, 347, 262, 140, 144, 147–148; 370/342, 335, 320, 441, 203, 208, 487, 254; 714/794–795
See application file for complete search history.

(56) References Cited

U.S. PATENT DOCUMENTS 6,072,807 A *   6/2000  Daudelin .................... 370/465
6,269,075 B1 *   7/2001  Tran ........................... 370/206
6,330,271 B1 *  12/2001  Klang et al. ................. 375/134
6,345,078 B1 *   2/2002  Basso ......................... 375/349
6,560,273 B1 *   5/2003  Sourour et al. ........... 455/226.2
6,650,692 B2 *  11/2003  Inoue et al. ................. 375/147
6,711,420 B1 *   3/2004  Amerga et al. ........... 455/562.1
6,819,931 B2 *  11/2004  Amerga et al. ........... 455/456.6
6,891,883 B2 *   5/2005  Sourour et al. ............. 375/148
2001/0014116 A1 *  8/2001  Saito et al. .................. 375/148

* cited by examiner

*Primary Examiner*—Mohammed Ghayour
*Assistant Examiner*—Sophia Vlahos
(74) *Attorney, Agent, or Firm*—Birch, Stewart, Kolasch & Birch, LLP

(57) ABSTRACT

A system for reassigning a plurality of tracking units of a wireless receiver, for receiving a plurality of multipath signals in a predetermined time period to reconstruct correspondingly an original signal. The system includes a searcher, a tracker and an assigning management unit. In particular, a predetermined estimating process includes the following steps to generate the assigning value of a combination of matching pairs: subtracting the searching time position and the predetermined tracking time position of every matching pairing the combination and taking absolute values to obtain a plurality of corresponding subtraction values; inputting the plurality of subtraction values to a predetermined estimating function to obtain a plurality of corresponding estimation values; and summing up the plurality of estimation values and obtaining the assigning value of the combination of matching pairs.

11 Claims, 8 Drawing Sheets second resolution path position may be searched by the seacher path position may be tracked by the tracker

METHOD OF TRACKING FINGER ASSIGNMENT

FIELD OF THE INVENTION

The present invention relates to a system for reassigning a plurality of rake finger tracking units in a rake receiver and, more particularly, a reassigning system for reassigning the plurality of rake finger tracking units to track the plurality of path signals according to the relationship of the searching time positions and the predetermined tracking time positions in the acquired combination of matching pairs from the assigning module.

BACKGROUND OF THE INVENTION

In recent years, spread spectrum communication systems are more and more important in personal mobile communication networks. In particular, direct sequence code division multiple access (DS/CDMA) has been adopted in third generation cellular standard. Rake receiver is frequently used in DS/CDMA system to overcome multipath problems.

Rake receiver contains a plurality of rake finger tracking units. Each rake finger tracking unit demodulates one multipath signal. The multipath information from each finger is then combined together using the maximum ratio combining technique to obtain a reconstructed signal with the maximum signal to noise ratio and, consequently, the smallest bit error rate.

FIG. 1 is a schematic diagram of a rake receiver according to the prior art. The rake receiver 10 comprises a searcher 14, a plural of rake finger tracking units (RFTU) 12, a rake finger management (RFM) 16 and a maximum ratio combiner (MRC) 18, wherein the maximum ratio combiner 18 is commonly used, but there are other kinds of maximum ratio combiners could also be used in the present invention.

When the rake receiver 10 receives an external multipath signals 13 from an antenna 11, the searcher 14 searches a plurality of peaks 15, 17, 19 in of the external multipath signal 13 with a first predetermined resolution, and the time positions of the peaks are figured out. The objective of the searcher 14 is to identify the existence of the path signals 15, 17, 19, so it is not necessary to use a high resolution. If the first predetermined resolution were too high, it would make the rake receiver 10 huge for calculating the signal and higher power consumption needed. The searcher 14 and the rake finger tracking units 12 need to match up with each other for the purpose of making rake receiver smaller and simpler, lower power consumption and accurate acquiring the time positions of peaks 15, 17, 19.

The rake finger management 16 assigns corresponding peaks of the multipath path signal for the rake finger tracking units to obtain the accurate time positions and the power of the corresponding multipath signals, and each tracking unit only tracks one peaks of the multipath signal. Therefore, the rake finger tracking units 12a, 12b, 12c each has a predetermined tracking time position, and each of the rake finger tracking units, 12a, 12b, 12c, tracks a corresponding peak with a second predetermined resolution wherein the second predetermined resolution is higher than the first predetermined resolution. The rake finger tracking units 12a, 12b, 12c would acquire the time positions more precisely compared with the path signal acquired from the searching time positions.

The rake finger tracking units would finally combine the corresponding path signals 15, 17, 19, by the maximum ratio combiner 18 to obtain the corresponding original signals. The original signals would have the maximum signal-interference ratio(SIR) after the aforementioned process.

Due to the variation of the multipath signals, the predetermined tracking time position might not catch the correct path signals 15, 17, 19, or the path signals are far from the predetermined tracking time position and are out of the effective tracking range. It means that there might be some idle rake finger tracking units or some rake finger tracking units cannot identify the path to track which causes the waste and idle units in the rake receiver.

Besides the three major components, the rake finger management 16 plays an important role in the rake receiver. The subject of the rake finger management 16 is to assign and manage the rake finger tracking units 12. However, the rake finger management unit according to the prior art could not solve the problem effectively. The rake finger management unit according to the prior art unnecessary reassigns the rake finger tracking units and leads to the longer tracking time and lower efficiency. Consequently, this invention provides a method to decrease unnecessary reassignment and improve the system efficiency if there is any idle rake finger tracking units or the path signals are far from the predetermined tracking time position.

SUMMARY OF THE INVENTION

An objective of this invention is to provide a system for reassigning a plurality of tracking units to track the plurality of path signals according to the relationship of the searching time positions and the predetermined tracking time positions in the acquired combination of matching pairs from the assigning module. By the way, the rake finger tracking unit tracks the path signal fast and further improve the performance of the whole rake receiver.

A reassigning system reassigns a plurality of tracking units of a wireless receiver in a wireless communication system for receiving a plurality of external multipath signals in a predetermined time period to reconstruct correspondingly an original signal. The reassigning system comprises a searcher, a tracker and an assigning management unit. The searcher searches a plurality of peaks in a multipath signal with a first predetermined resolution, and accordingly acquires a plurality of corresponding searching time positions. The tracker comprises the plurality of tracking units, each of the tracking units tracks a corresponding peak with a predetermined tracking time position and a second predetermined resolution wherein the second predetermined resolution is higher than the first predetermined resolution. The assigning management unit comprises a matching module, an estimating module, an assigning table and an assigning module. The matching module matches the plurality of searching time positions and the plurality of predetermined tracking time positions by a predetermined matching process, and accordingly generates a plurality of combinations of matching pairs. The estimating module estimates the searching time position and the predetermined tracking time position in each combination of matching pairs by a predetermined estimating process, and accordingly generates an assigning value corresponding to the combination. The assigning table stores the relationships of the plurality of searching time positions and the plurality of predetermined tracking time positions of the plural combinations of matching pairs, and stores the assigning value of each combination. The assigning module acquires a smallest assigning value among the plural assigning values from the assigning table, and a combination of matching pairs corresponding to the smallest assigning value.

The assigning management unit reassigns the plurality of tracking units to track the plurality of path signals according to the relationship of the searching time positions and the predetermined tracking time positions in the acquired combination of matching pairs from the assigning module.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE APPENDED DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

In a wireless communication system, the efficiency of the wireless receiver depends on the accuracy and settling time of tracking units in tracking multipath signals. If the tracking units could track the tracking time position correctly and quickly, the performance of the rake receiver would be improved. The present invention provides a system for reassigning the rake finger tracking units effectively to track the peaks of receiving signal acquired by the searcher. The present invention could not only reduce the possibility of tracking the wrong peaks but also raise the validity of multipath signals in the wireless receiver. Following is the detailed description of the invention.

Figure 1:
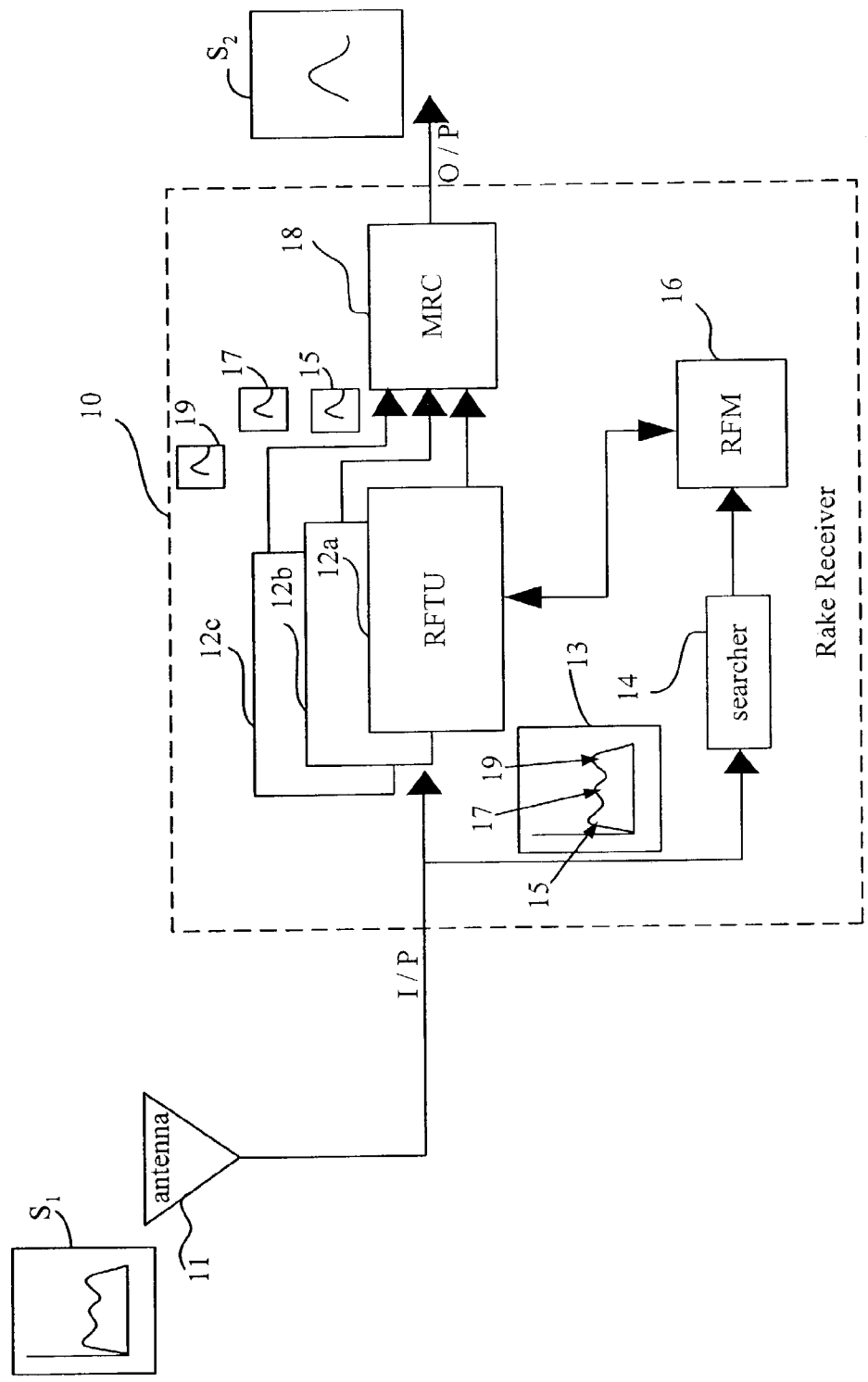
FIG. 1 is a schematic diagram of a rake receiver according to the prior art.
Figure 2:
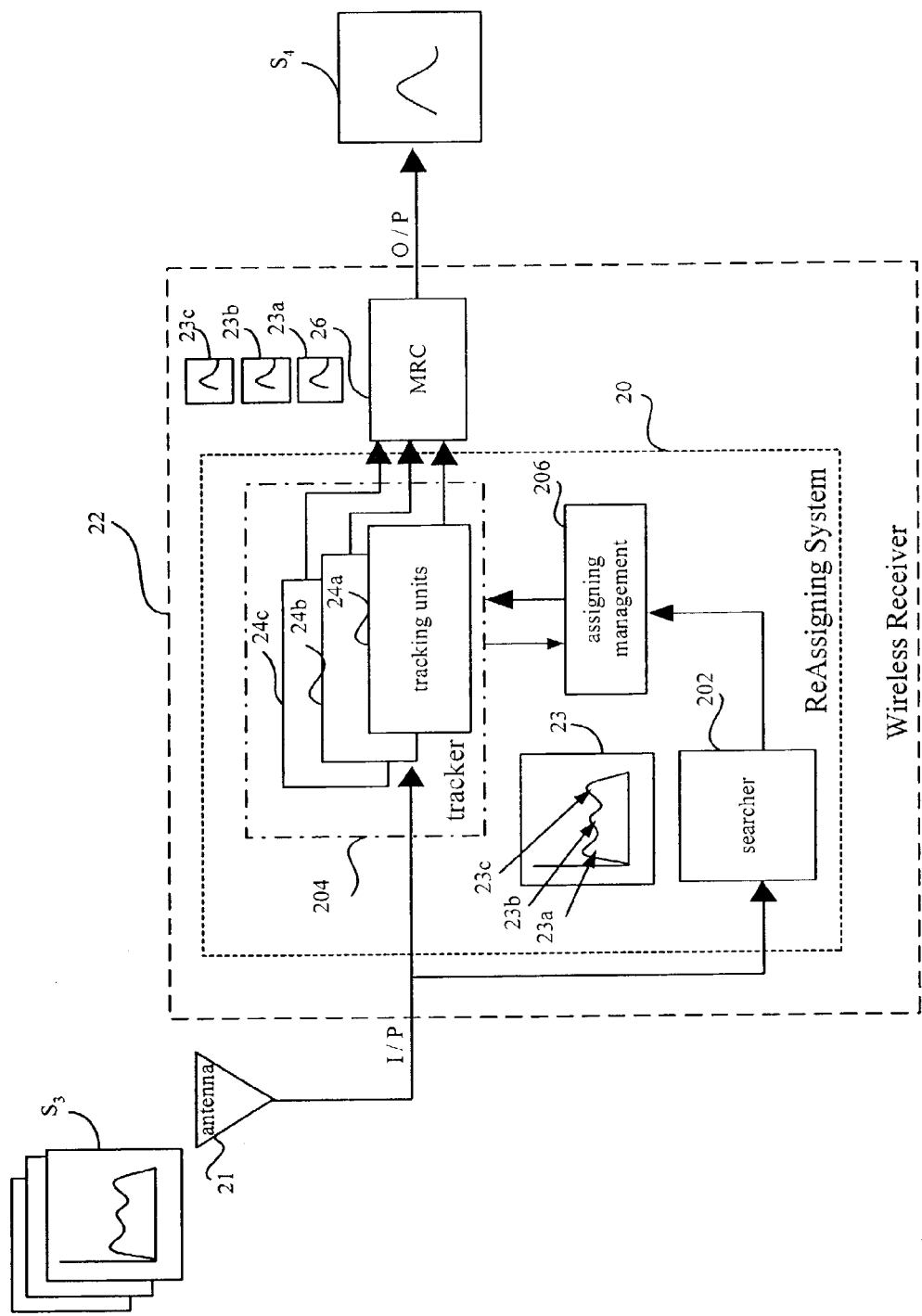
FIG. 2 is a schematic diagram of the preferred embodiment according to the present invention.

Please refer to FIG. 2. FIG. 2 is a schematic diagram of the preferred embodiment according to the present invention. The present invention provides a reassigning system 20 for reassigning a plurality of tracking units 24a, 24b, 24c of a wireless receiver 22 in a wireless communication system. The wireless receiver 22 receives a external multipath signal S3 from an antenna 21 to reconstructs an original signal S4 corresponding to the multipath signal S3. In the preferred embodiment of the present invention, the wireless communication system is a Code Division Multiple Access communication system (CDMA), the wireless receiver 22 is a rake receiver, and the plurality of tracking units 24a, 24b, 24c are a plurality of rake finger tracking units wherein the three tracking units are utilized to simplify this case, however, more units can be accommodated.

The reassigning system 20 according to the present invention comprises a searcher 202, a tracker 204 and an assigning management unit 206. The searcher 202 searches a plurality of peaks 23a, 23b, 23c in a multipath signal 23 with a first predetermined resolution, and accordingly acquires a plurality of corresponding searching time positions. For example, a chip time is divided into 2 units that means the first predetermined resolution is 0.5 chip time. The tracker 204 comprises the plurality of tracking units 24a, 24b, 24c, each of the tracking units 24a, 24b, 24c tracks the plurality of corresponding peaks 23a, 23b, 23c in a multipath signal 23 with a predetermined tracking time position and a second predetermined resolution wherein the second predetermined resolution is higher than the first predetermined resolution. For example, a chip time is divided into 8 units that mean the second predetermined resolution is 0.125 chip time. The wireless receiver 22 comprises a maximum ratio combiner 26 for combining the plurality of path signals 23a, 23b, 23c, to reconstruct the original signals S4 corresponding to the multipath signal.

Figure 3:
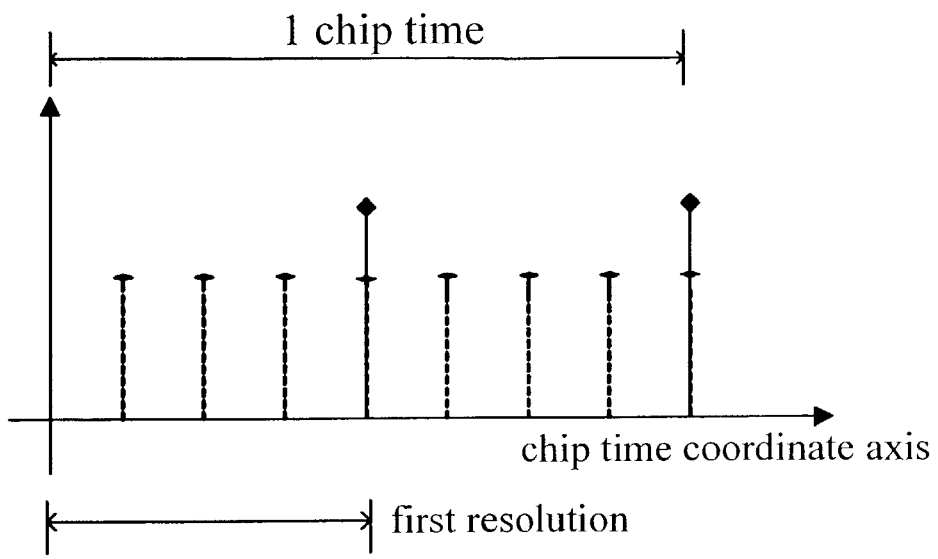
FIG. 3 is a schematic diagram illustrating the first predetermined resolution, the second predetermined resolution and the chip time.
Figure 3:
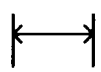
Figure 3:
Figure 3:

Further more, the rake receiver receives the signal every 10 millisecond (ms). Every 10 ms is regard as a frame, and each frame is divided into 15 time slots, each time slot is divided into 2560 chip times. As a result, every second could be divided into 3.84 million chip times. The definition of chip time different from system to system. The searcher 202 searches the plurality of path signals every 0.5 chip time and we regard it as the first predetermined resolution. The tracker 204 tracks the plurality of path signals every 0.125 chip time and we regard it as the second predetermined resolution. The corresponding tracking time position is more precise than the searching time position. FIG. 3 is a schematic diagram illustrating the first predetermined resolution, the second predetermined resolution and the definition of chip time.

Figure 4:
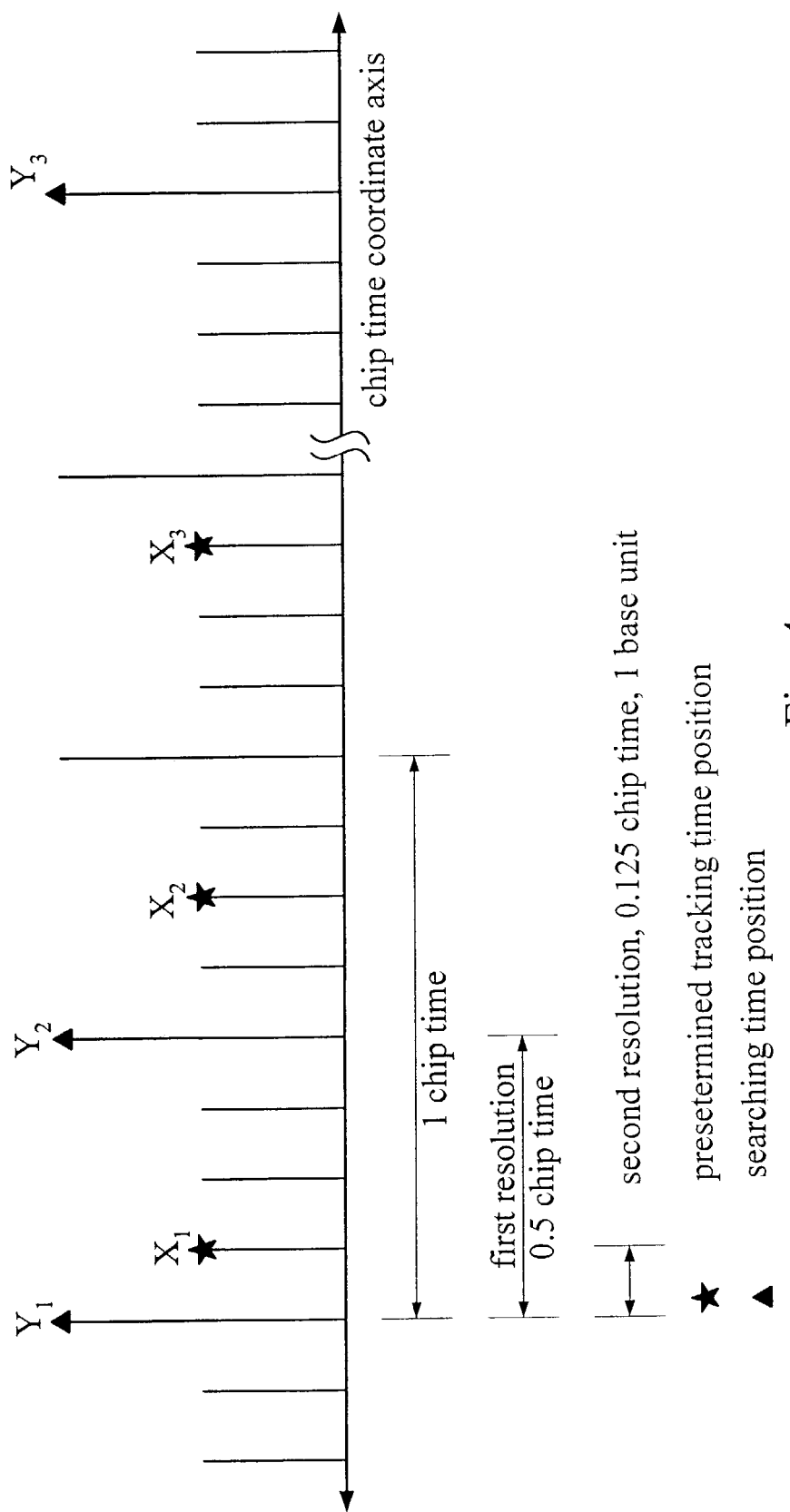
FIG. 4 is a schematic diagram illustrating the searching time positions Y1, Y2, Y3 and the predetermined tracking time positions X1, X2, X3.

When the wireless receiver deals with the multipath signals, the searcher 202 searches the amount and general time positions of the multipath signals 23, then the plurality of tracking units 24a, 24b, 24c in tracker 204 tracks the more precise time position of each peak. It might happen that the predetermined tracking time position of tracking units 24a, 24b, 24c are X1, X2, X3, and the predetermined searching time positions of searcher 202 are Y1, Y2, Y3. If the subtracting value is between the predetermined tracking time position X3 of tracking units 24c and the predetermined searching time positions Y3 is under the tolerance, the wireless receiver 22 doesn't need to reassign the tracking units 24c. If the subtracting value between the predetermined tracking time position X3 and the predetermined searching time positions Y3 is too large, such as 10 ms, the tracking units 24c could not track the corresponding peaks, and the predetermined tracking time position X3 of tracking units 24c must be adjusted, shown in FIG. 4. The wireless receiver 22 would unnecessary reassign the tracking units 24c with improper reassigning method. Following is the detailed description of the assigning management unit 206 of reassigning system 20 according to the present invention.

Figure 5:
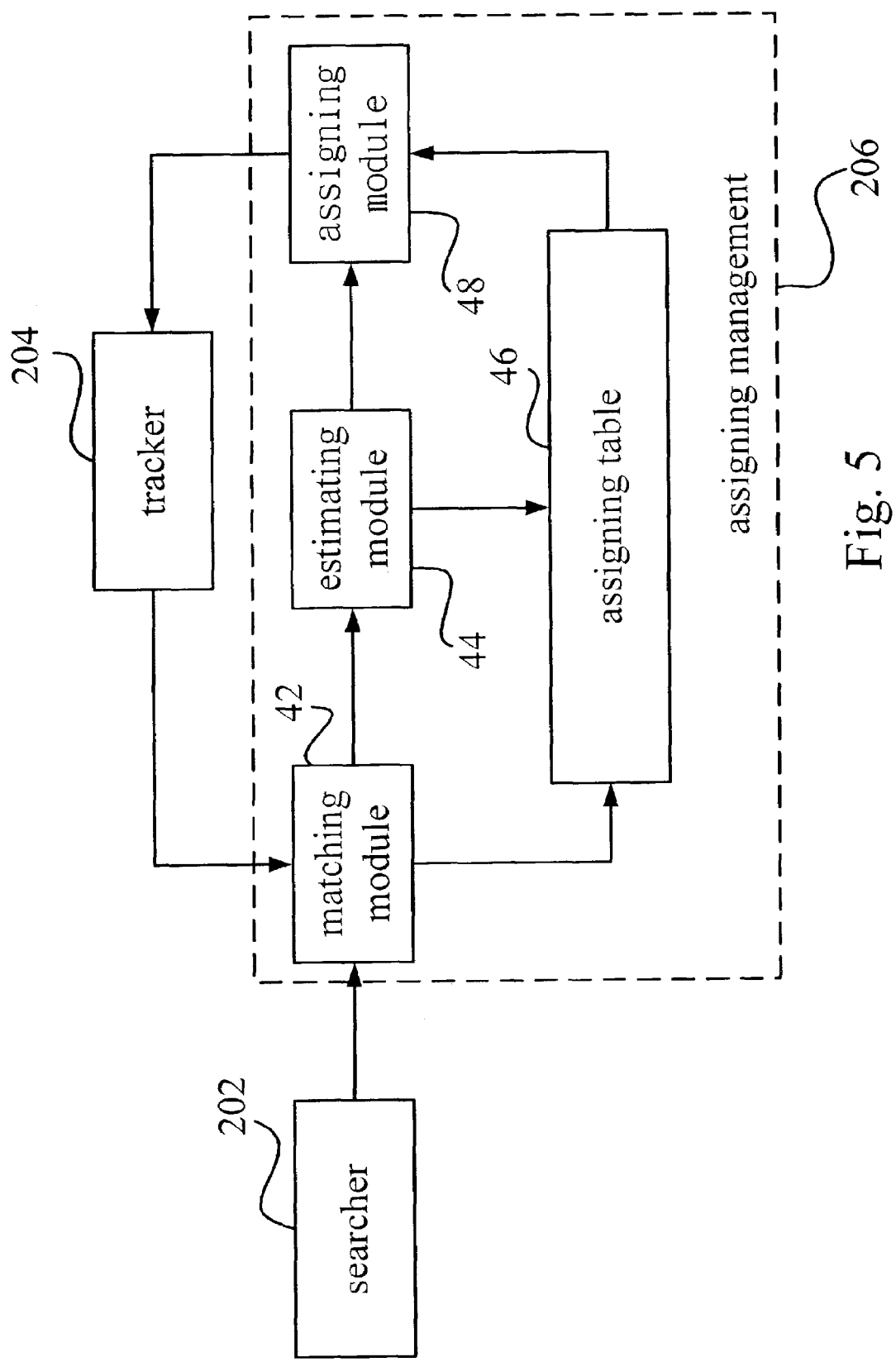
FIG. 5 is a block diagram illustrating the assigning management of the assigning system according to the present invention.

Please refer to FIG. 5. FIG. 5 is a block diagram illustrating the assigning management unit 206 of the assigning system 20 according to the present invention. The assigning management unit 206 comprises a matching module 42, an estimating module 44, an assigning table 46 and an assigning module 48.

The matching module 42 matches the plurality of searching time positions Yi and the plurality of predetermined tracking time positions Xi by a predetermined matching process, and accordingly generates a plurality of combinations of matching pairs. Wherein the predetermined matching process matches the plurality of searching time positions Yi and the plurality of predetermined tracking time positions Xi one by one; and accordingly, as a result of different matching pairs, such as n searching time positions and n predetermined tracking time positions, the matching module would generate n! different combinations of matching pairs. Then the assigning management unit 206 would store the n! combinations of matching pairs in the assigning table 46. Following is the relationship between Xi and Yi illustrated by 3 time positions Y1, Y2, Y3 and 3 predetermined tracking time positions X1, X2, X3.

Matching the searching time positions Y1, Y2, Y3 and the predetermined tracking time positions X1, X2, X3 one by one, as a result of different matching pairs, 6 different combinations of matching pairs are achieved.

[(X1'Y1), (X2'Y2), (X3'Y3) ],

[(X1'Y1), (X2'Y3), (X3'Y2) ],

[(X1'Y2), (X2'Y1), (X3'Y3) ],

[(X1'Y2), (X2'Y3), (X3'Y1) ],

[(X1'Y3), (X2'Y1), (X3'Y2) ],

[(X1'Y3), (X2'Y2), (X3'Y1) ].

Figure 7:
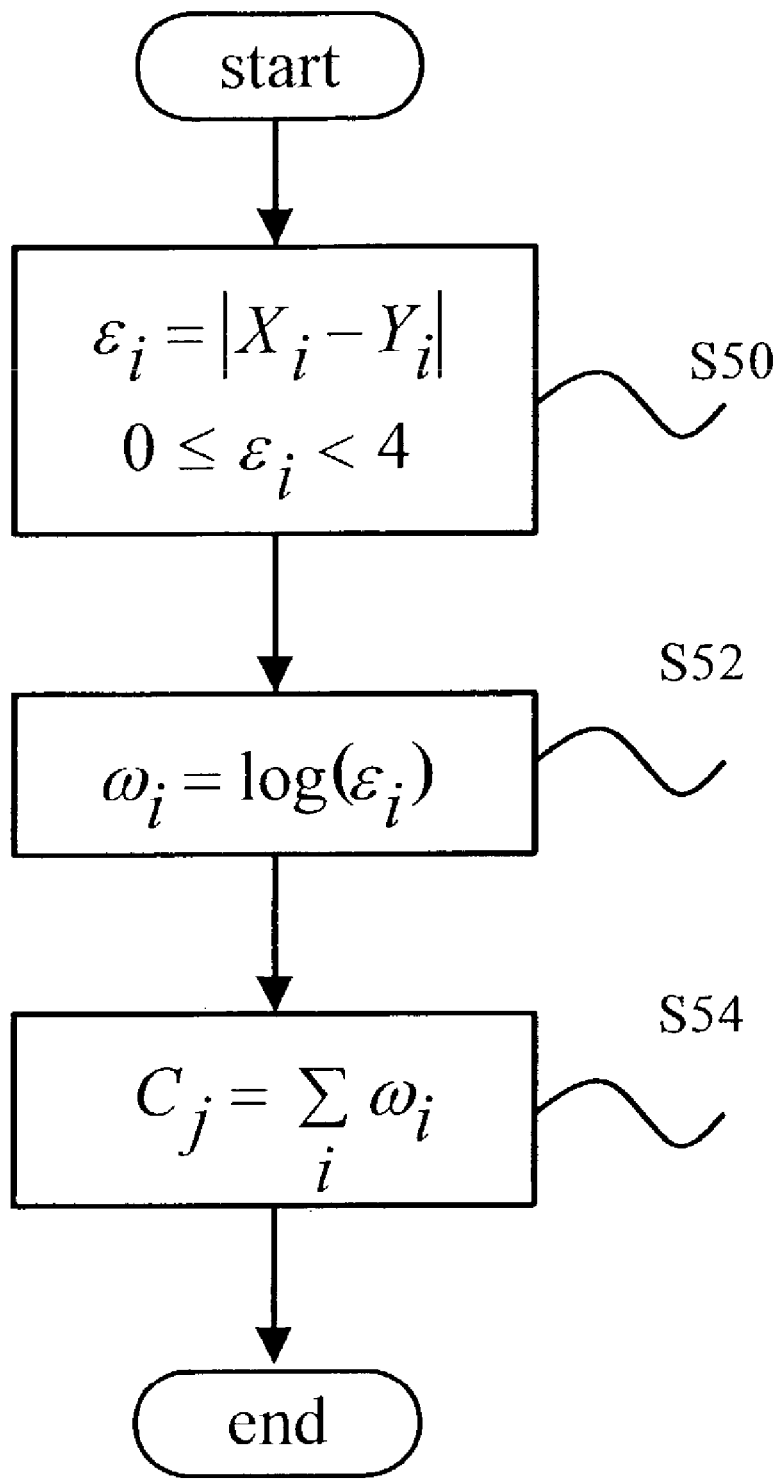
FIG. 7 is a flow chart of the estimating procedure according to the present invention.

The estimating module 44 estimates the searching time position Yi and the predetermined tracking time position Xi in each combination of matching pairs by a predetermined estimating process, and accordingly generates an assigning value corresponding to the combination. Wherein the predetermined estimating process comprises the following steps to generate the assigning value of a combination of matching pairs, shown in FIG. 7:

Step S50: subtracting the searching time position Xi and the predetermined tracking time position Yi of every matching pairing the combination and taking absolute values |Xi−Yi| to obtain a plurality of corresponding subtraction values $\epsilon_i$;

$$\epsilon_i = |Xi - Yi|$$

The basic unit of the time position according to the present invention is the second predetermined resolution, such as 0.125 chip time, hence the searching time position Xi, the tracking time position, the predetermined tracking time position Yi and the subtraction values $\epsilon_i$ are all integers. The tracking units adopt 1 chip time as the tracking range. According to the preferred embodiment of the present invention, there are 8 basic units of time position in a chip time. The upper and lower limit of tracking range are adding or subtracting 4 basic units from the predetermined tracking time position. If the subtracting value is between the tracking time position and searching time position is more than 4 basic units, the tracking units could not track the multipath signals effectively. Consequently, the present invention defines the subtraction values $\epsilon_i$ between 0 and 4. If the subtraction values $\epsilon_i$ is over 4 according to the present invention, the tracking units could not track any corresponding time position from the multipath signals, and it means, $$0 \leq \epsilon_i < 4$$

Then, going to step S52. Step S52: inputting the plurality of subtraction value $\epsilon_i$ to a predetermined estimating function F to obtain a plurality of corresponding estimation values $\omega_i$.

$$\omega_i = F(\epsilon_i)$$

The smaller the subtracting value is, in other words, the subtracting value between the predetermined tracking time position and searching time position is closer, the less the corresponding estimation values $\omega_i$ is. According to the preferred embodiment of the present invention, the estimating function has to meet the following requirements:

the estimation value $\omega_i$ decreasing as the subtraction value $\epsilon_i$ decreases;

the estimating function being a non-linear function;

the first derivative of the estimating function being larger than zero, $\omega_i'(\epsilon) > 0$; and the second derivative of the estimating function being smaller than zero, $\omega_i''(\epsilon) < 0$.

In the preferred embodiment of the present invention, the estimation function is a logarithmic function.

$$\omega_i = F(\epsilon_i) = \log(\epsilon_i)$$

Going to step S54. Step S54: summing up the plurality of estimating values $\omega_i$ and obtaining the assigning value Cj of the matching pairs, j=1~n!;

$$Cj = \Sigma_i \omega_i$$

The aforementioned is the estimating process. The assigning management unit 206 of reassigning system 20 according to the present invention is as follows.

Figure 6:
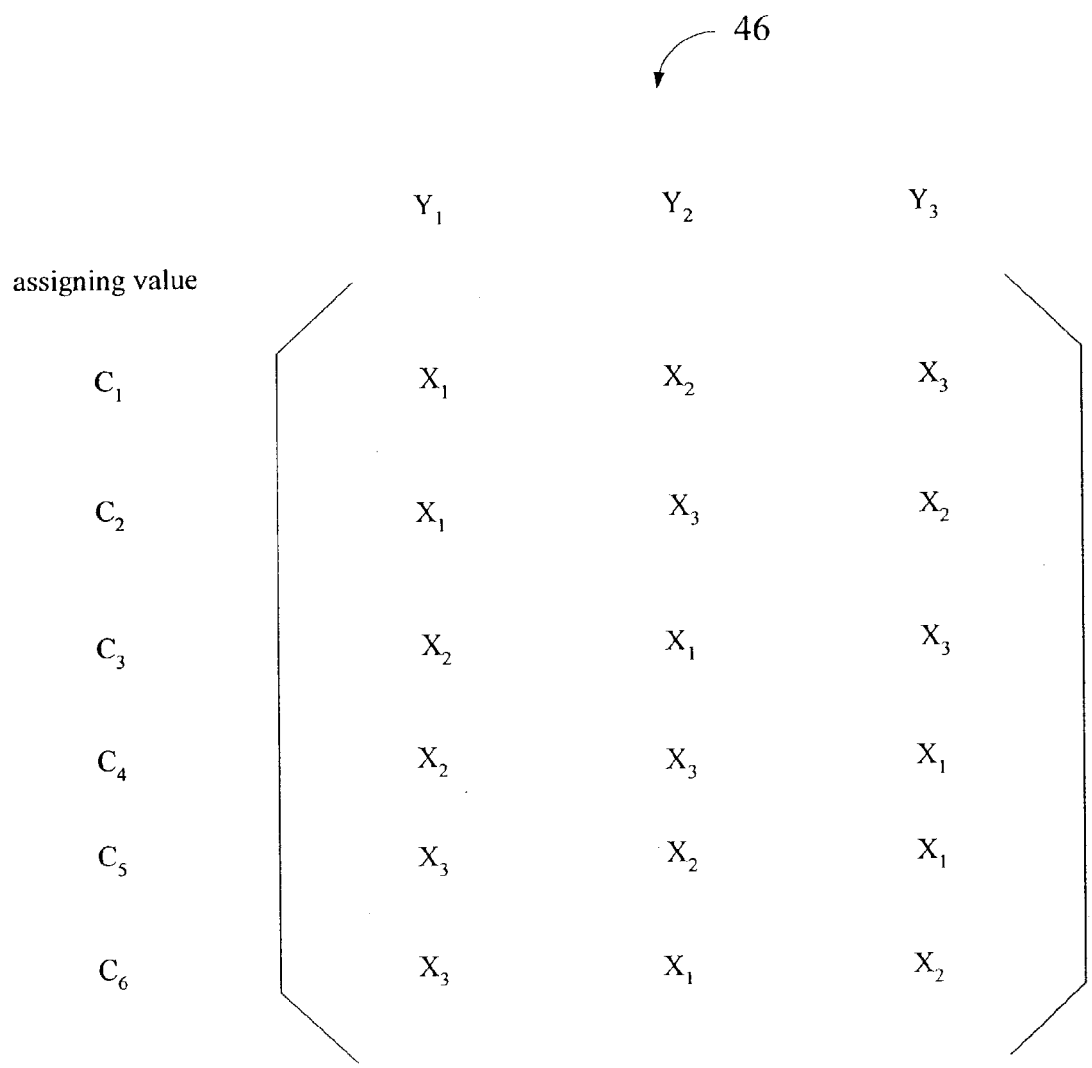
FIG. 6 is a schematic diagram of the assigning table according to the present invention.

Please refer to FIG. 6. FIG. 6 is a schematic diagram of the assigning table according to the present invention. The assigning table 46 stores the relationships of the plurality of searching time positions Xi and the plurality of predetermined tracking time positions Yi of the plural combinations of matching pairs, and stores the assigning value Cj of each combination. The assigning module 48 acquires from the assigning table 46 a smallest assigning value among the plural assigning values and a combination of matching pairs corresponding to the smallest assigning value C.

The assigning management unit 206 reassigns the plurality of tracking units 24a, 24b, 24c in wireless receiver 22 to track the plurality of peaks according to the relationship of the searching time positions Xi and the predetermined tracking time positions Yi in the acquired combination of matching pairs from the assigning module 48. Moreover, when there are more than one combinations of matching pairs corresponding to the same smallest assigning value, the assigning management unit 206 reassigns the plurality of tracking units according to any one of the aforementioned combinations.

Following is the detailed description of the reassigning method according to the present invention, so as to illustrate the reassigning method clearly.

Figure 8:
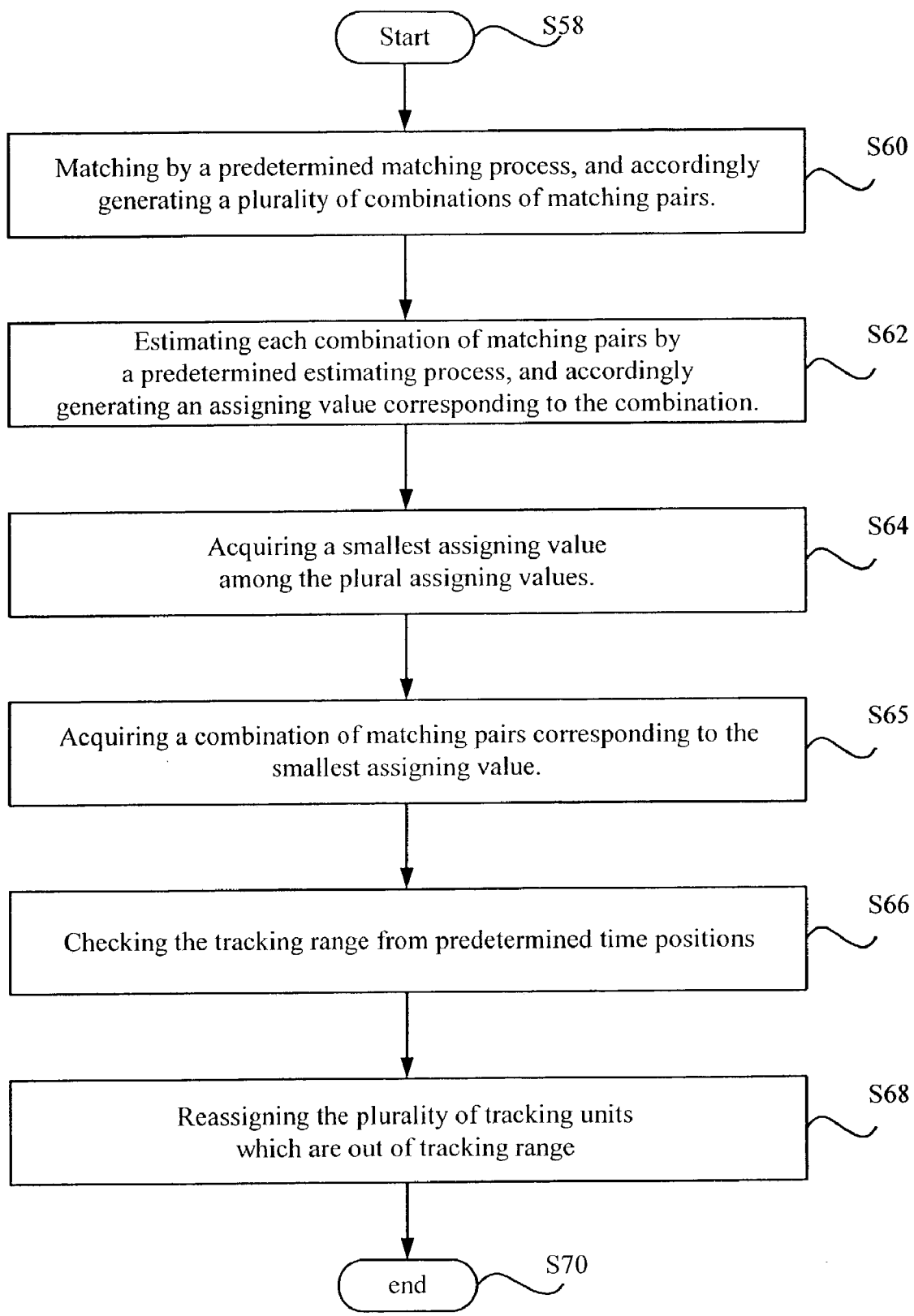
FIG. 8 is a flow chart of the assigning method according to the present invention.

Please refer to FIG. 8. FIG. 8 is a flow chart of the assigning method according to the present invention. The assigning method is matching the plurality of searching time positions and the plurality of predetermined tracking time positions of tracking units, and choosing the proper pairs to reassign the plurality of tracking units 24a, 24b, 24c. The reassigning method comprises:

Step S58: starting;

Step S60: matching the plurality of searching time positions and the plurality of predetermined tracking time positions by a predetermined matching process, and accordingly generating a plurality of combinations of matching pairs;

Step S62: estimating the searching time position and the predetermined tracking time position in each combination of matching pairs by a predetermined estimating process, and accordingly generating an assigning value corresponding to the combination;

Step S64: acquiring a smallest assigning value among the plural assigning values;

Step S65: acquiring a combination of matching pairs corresponding to the smallest assigning value;

Step S66: check the tracking range of the matching pairs in the acquired combination according to the searching time positions and the predetermined tracking time positions;

Step S68: reassigning the plurality of tracking units in the wireless receiver according to the adjusted predetermined time positions;

Step S70: Ending.

This invention provides a system for reassigning the plurality of tracking units to track the plurality of path signals according to the relationship of the searching time positions and the predetermined tracking time positions in the acquired combination of matching pairs from the assigning module. The present invention could prevent the tracking units which is still within the correct tracking range being reassigned and decrease the rate of reassignments. Those skills in the art will readily observe that numerous modifications and alterations of the device may be made while retaining the teaching of the invention. Accordingly, the above disclosure should be construed as limited by the metes and bounds of the appended claims.

What is claimed is:

1. A reassigning system for reassigning a plurality of tracking units of a wireless receiver for receiving a plurality of multipath signals in a predetermined time period to reconstruct a correspondingly original signal, the reassigning system comprising:
    a searcher for searching a plurality of peaks in a multipath signal with a first predetermined resolution, and accordingly acquiring a plurality of corresponding searching time positions;
    a tracker comprising the plurality of tracking units, each of the tracking units tracking a corresponding peak value with a predetermined tracking time position and according to a second predetermined resolution wherein the second predetermined resolution is higher than the first predetermined resolution; and
    an assigning management unit,
    wherein the assignment management unit comprises:
        a matching module for matching the plurality of searching time positions and a plurality of predetermined tracking time positions by a predetermined matching process, and accordingly generating a plurality of combinations of matching pairs;
        an estimating module for estimating the searching time position and the predetermined tracking time position in each combination of matching pairs by a predetermined estimating process, and accordingly generating an assigning value corresponding to each combination of matching pairs;
        an assigning table for storing relationships of the plurality of searching time positions and the plurality of predetermined tracking time positions of the plural combinations of matching pairs, and storing the assigning value of the combination; and
        an assigning module for acquiring from the assigning table a smallest assigning value among the plural assigning values and a combination of matching pairs corresponding to the smallest assigning value;
    wherein the assigning management unit reassigns the plurality of tracking units to track the plurality of multipath signals according to the relationship of the searching time positions and the predetermined tracking time positions in the acquired combination of matching pairs from the assigning module; and
    wherein the estimating module generates the assigning value corresponding to each combination of matching pairs by using: means for subtracting the searching time position and from predetermined tracking time position of every matching pair in the combination of matching pairs and taking absolute values to obtain a plurality of corresponding subtraction values; means for inputting the plurality of subtraction values to a predetermined estimating function to obtain a plurality of corresponding estimation values; and means for summing up the plurality of estimation values and obtaining the assigning value of the combination of matching pairs.

2. The reassigning system of claim 1, wherein the plurality of tracking units of the wireless receiver is a plurality of rake finger tracking units of a rake receiver.

3. The reassigning system of claim 1, wherein the predetermined matching process matches the plurality of searching time positions and the plurality of predetermined tracking time positions one by one; and accordingly, as a result of different matching pairs, for the matching module to generate the plurality of different combinations of matching pairs.

4. The reassigning system of claim 1, wherein the estimating function meets the following requirements:
    the estimation value decreases as the subtraction value decreases;
    the estimating function is a non-linear function;
    the first derivative of the is function being larger than zero; and
    the second derivative of the estimating function is smaller than zero.

5. The reassigning system of claim 4, wherein the estimation function is a logarithmic function.

6. The reassigning system of claim 1, wherein when there are more than one combinations of matching pairs corresponding to the same smallest assigning value, the assigning management unit reassigns the plurality of tracking units according to any one of the aforementioned combinations.

7. The reassigning system of claim 1, wherein the reassigning system comprises a combiner for reconstructing the original signal corresponding to the received plurality of multipath signals.

8. A reassigning method for reassigning a plurality of tracking units of a wireless receiver in a wireless communication system for receiving a plurality of multipath signals in a predetermined time period to reconstruct a correspondingly original signal, the reassigning method comprising:
    searching a plurality of peaks in a miltipath signal with a first predetermined resolution, and accordingly acquiring a plurality of corresponding searching time positions;
    tracking a plurality of multipath signal with a plurality of corresponding predetermined tracking time positions and according to a second predetermined resolution wherein the second predetermined resolution is higher than the first predetermined resolution;
    matching a plurality of searching time positions and the plurality of predetermined tracking time positions by a predetermined matching process, and accordingly generating a plurality of combinations of matching pairs;

estimating the searching time position and the predetermined tracking time position in each combination of matching pairs by a predetermined estimating process, and accordingly generating an assigning value corresponding to each combination of matching pairs;

acquiring a smallest assigning value among the plural assigning values and a combination of matching pairs corresponding to the smallest assigning value; and reassigning the plurality of tracking units to track the plurality of multipath signals according to the relationship of the searching time positions and the predetermined tracking time positions in the acquired combination of matching pairs from the assigning module;

wherein the predetermined estimating process comprises the following steps to generate the assigning value of a combination of matching pairs: subtracting the searching time position from the predetermined tracking time position of every matching pair in the combination of matching pairs and taking absolute values to obtain a plurality of corresponding subtraction values; inputting the plurality of subtraction values to a predetermined estimating function to obtain a plurality of corresponding estimation values; and swimming up the plurality of estimation values and obtaining the assigning value of the combination of matching pars.

9. The reassigning method of claim 8, wherein the predetermined matching process is to match the plurality of searching time positions and the plurality of predetermined tracking time positions one by one; and accordingly, as a result of different matching pairs, for the matching module to generate the plurality of different combinations of matching pairs.

10. The reassigning method of claim 8, wherein the estimating function meets the following requirements:

the estimation value decreases as the subtraction value decreases;

the estimating function is a non-linear function;

the first derivative of the estimating function is larger than zero; and the second derivative of the estimating function is smaller than zero.

11. The reassigning method of claim 10, wherein the estimation function is a logarithmic function.

* * * * *